Aug. 31, 1948.  J. P. MICHELA  2,448,385
DEBURRING TOOL
Filed June 10, 1944
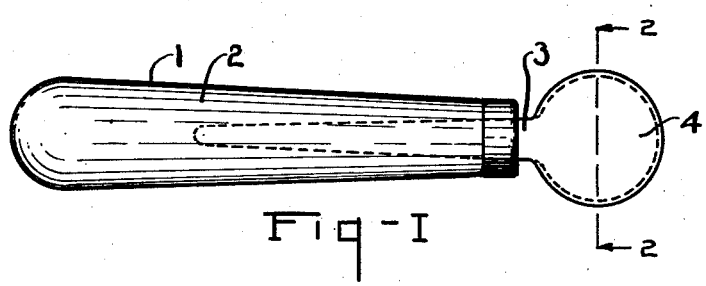
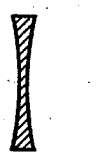  
Fig-2  Fig-3  Fig-4  Fig-5
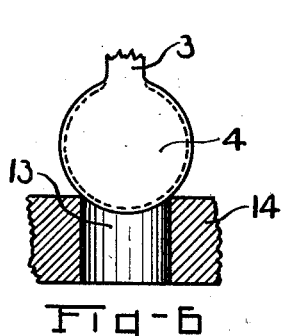
Fig-6
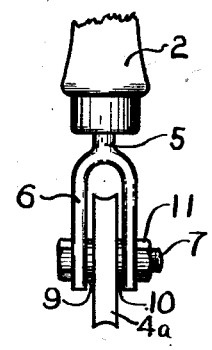
Fig-8
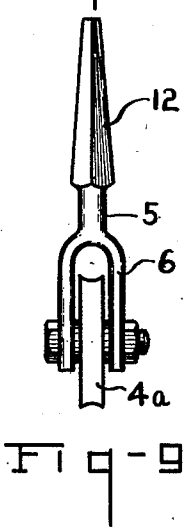
Fig-9
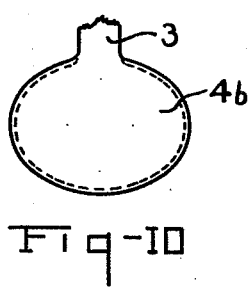
Fig-10
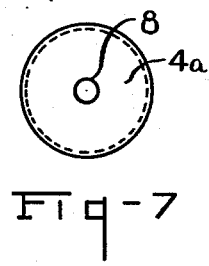
Fig-7
INVENTOR
John P. Michela
BY Roy A. Plant
ATTORNEY Patented Aug. 31, 1948

2,448,385

UNITED STATES PATENT OFFICE 2,448,385

DEBURRING TOOL

John P. Michela, Battle Creek, Mich., assignor of thirty-three and one-third per cent to Otto L. Powers, and thirty-three and one-third per cent to L. Reuben Schmuck, both of Battle Creek, Mich.

Application June 10, 1944, Serial No. 539,762

13 Claims. (Cl. 77—73)

The present invention relates broadly to cutting and scraping devices, and in its specific phases to deburring reamers.

Reamers for deburring the edges of openings, such as the end of pipes, have been made V shaped and formed with a single straight cutting edge on each side of the V. This edge cuts upon rotation in one direction only, and wears out at the one contact spot when used with one size of pipe. Makeshift deburrers have also been proposed, such as by sharpening one edge of the corner of an end wrench used by electricians on conduit. Devices of these types are unsatisfactory for burr benchwork where deburring of the edges of openings, slots, grooves, et cetera is required. It was with these disadvantages and shortcomings of the prior art in mind that the highly simplified and effective deburring tool of the present invention was devised.

Accordingly among the objects of the present invention is the provision of a simple construction deburring tool which is suitable for deburring various size holes, slots, grooves, et cetera.

Another object is to provide a deburring tool the head of which is relatively thick, and double-edged for operation upon rotation or movement in either direction.

Another object is to supply a deburring tool which presents, under conditions of use, more than one spot for deburring regardless of whether the size of the opening being deburred is always the same.

Another object is to provide a thick-edged deburring tool which is specially ground to facilitate deburring use.

A further object is to provide a deburring tool with a rounded profile which has the respective edges of both faces sharpened.

A still further object is to provide a rotary blade deburring tool with sharp edges.

A still further object is to provide a rotatable deburring tool which is operable upon rotation in either direction, and is provided with a shank adapted for power drive.

Still further objects and advantages of the present invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but several of various ways in which the principle of the invention may be used.

In the annexed drawing:

Figure 1 illustrates a side view of a simple type of hand operated deburring tool embodying one form of the present invention.

Figure 2 illustrates a section taken along line 2—2 of Figure 1.

Figures 3, 4, and 5 illustrate sections similar to that shown in Figure 2 but with different profiles.

Figure 6 illustrates in fragmentary elevation, the use of a deburring tool, such as shown in Figure 1, for deburring the end of a drilled hole.

Figure 7 illustrates a side view of a deburring wheel such as is shown in the asemblies illustrated in Figures 8 and 9.

Figure 8 illustrates a fragmentary elevation of a hand operated deburring tool with rotary deburring wheel.

Figure 9 illustrates a modified deburring tool with the shank squared for brace or machine operation, said tool having a rotatable deburring wheel.

Figure 10 illustrates in fragmentary elevation a modified form of deburring tool.

Referring more particularly to Figure 1 of the drawing, the deburring tool assembly 1 has a handle 2 into which extends a shank 3 which carries head 4 of the tool. This head is preferably rounded, as is typically illustrated in Figures 1 and 10, and sharpened by forming to different profiles, as by grinding, four of these profiles being illustrated in Figures 2 to 5 inclusive. Figure 2, for instance, illustrates a head member which is hollow-ground on both of its side faces as well as on its periphery, while Figure 3 illustrates a head which is hollow-ground only on both side faces. Figure 4, on the other hand, illustrates a head which is hollow-ground only on its periphery. Where hollow-grinding of the head is difficult due to lack of equipment, a flat face and periphery-grind can be resorted to as typically illustrated in Figure 5. Flat face and periphery-grinding is also useful where a relatively soft metal is to be deburred, since it reduces any tendency to chatter under conditions of use. The grinding to form these relatively sharp edges makes the tool cut easier and smoother under conditions of operation, as well as operate equally well when rotated in either direction or moved back and forth in either direction under conditions of use. By making the head relatively thick, the faces of same, which may or may not be parallel, will terminate in separate edges which can be sharpened for use as described.

To provide a longer life cutting edge for the deburring tool, the head may be made in the form of a small disc 4a (Figure 7) which is rotatable on its axis under conditions of use. A hand tool utilizing this type of deburring disc is typically illustrated in Figure 8 where shank 5 of forked member 6 extends into handle 2. A bolt 7 passes through forked member 6 and hole 8 in disc 4a to rotatably hold the latter in place. For convenience, space washers 9 and 10 may be used on each side of disc 4a, but these washers should be of suitable thickness to hold disc 4a in place without binding same in normal operation. If desired, however, where it is decided not to use a freely rotatable disc, the washers may be made of a thickness permitting clamping of the disc upon tightening nut 11 on bolt 7. This construction allows controlled rotation of disc 4a as the edge of same becomes dulled from use.

A modified form of the assembly illustrated in Figure 8 is shown in Figure 9. Shank 5 of forked member 6, in this construction, is provided with a squared end 12 adapted for being gripped in a suitable brace or chuck so that the whole assembly may be rotated for more rapid deburring action.

The use of the tool illustrated in Figure 1 for deburring the end of a drilled hole is typically illustrated in Figure 6 wherein head 4 of the tool is shown as applied to one end of hole 13 in work piece 14. Rotation of the tool in either direction, under these conditions, will cause the sharp edges of head 4 to remove any burr on the edge of the hole. A rocking motion during rotation of the tool will distribute the wear on the cutting edges of same and prolong their life between sharpenings. The head 4 or disc 4a, in any case, should be of high grade heat treated and hardened tool steel or other suitable cutting material, such as "Carboloy," so that when same is sharpened it will hold its edge for a considerable period of time.

In order to take advantage of the self centering of the tool in use and the spreading of the wearing area of same, as well as for ease of operation, the profile of the cutting edge of same is preferably curved so as to be round or elliptical as typically illustrated in Figures 1, 7, and 10. By making the tool with rounded profile and sharpened edges as described, it may also be used for spot-scraping of a surface should the occasion require.

Other modes of applying the principle of my invention may be employed instead of those explained, change being made as regards the article herein disclosed, provided the means stated by any of the following claims or the equivalent of such stated means be employed.

I therefore particularly point out and distinctly claim as my invention:

1. A tool which has a substantially rounded profile disc shaped head and an extending handle, said head having a relatively thick edge with channel therein so as to form a pair of relatively sharp edges alongside of and substantially parallel to each other.

2. A tool which has a substantially rounded profile disc shape head, and an extending handle, said head having hollowed faces and a relatively thick edge with a channel therein so as to form a pair of relatively sharp edges alongside of and opposite to each other.

3. A tool which has a substantially rounded profile disc shape head, a shank extending therefrom, a handle on said shank, said head having a relatively thick edge with channel therein so as to form a pair of relatively sharp edges alongside of and opposite to each other.

4. A tool which has a substantially rounded profile disc shape head, a shank extending therefrom, a handle on said shank, said head having hollowed faces and a relatively thick edge with a channel therein so as to form a pair of relatively sharp edges alongside of and opposite to each other.

5. A tool which has a substantially rounded profile disc shaped head, a shank extending from the edge of said head, and an extending handle mounted on said shank, said head being imperforate and having a relatively thick periphery so as to form a pair of side edges alongside of and opposite to each other, the opposite faces of said head being continuous for rigidity and hollow to facilitate sharpening of said tool.

6. A tool which has a substantially symmetrically curved profile head and an extending handle, said head having a relatively thick periphery so as to form a pair of edges of substantially equal radii alongside of and opposite to each other, said periphery having a substantially full width channel between the edges thereof, the opposite faces of said head also being hollow.

7. A tool which has a handle, a forked means extending therefrom, a wheel member, and means for fastening said wheel member to said forked means, said wheel member having a relatively thick periphery with both edges substantially parallel and relatively sharp.

8. A tool which has a shank, one end of said shank being of a size adapted to fit a chuck, a fork on the other end of said shank, a wheel member, and means for fastening said wheel member in said fork, said wheel member having a relatively thick periphery with the edge of the opposite faces having substantially the same radii from the axis of the wheel and being relatively sharp.

9. A tool which has a shank with operating means at one end thereof and a forked means at the other, a wheel member, and means for fastening said wheel member to said forked means, said wheel member being disc shaped and having a relatively thick periphery with both edges of same substantially opposite to each other, relatively sharp and of substantially identical radii in the cutting area.

10. A relatively uniform curved edge disc shaped member which is relatively thick and sharpened on both side edges, a shank extending from the disc shaped member, and a handle on said shank, whereby said apparatus can be used for deburring or the like by rotation of the disc shaped member in either direction about the axis of the handle.

11. A deburring tool consisting of a handle, a shank, a wheel member, and means for mounting said wheel member on said shank for free rotation in either direction, said wheel member having a relatively thick periphery with the edge of the opposite faces having substantially the same radii from the axis of the wheel, the periphery of said wheel having a substantially full width channel between the edges thereof, said edges being sharpened.

12. A deburring tool consisting of a handle, a shank, a wheel member, and means for mounting said wheel member on said shank for free rotation in either direction, said wheel member having a relatively thick periphery with the edge of the opposite faces of same having substantially the same radii from the axis of the wheel and being sharpened, whereby same may be used for deburring by rotating the assembly in either direction about the axis of the handle.

13. A deburring tool consisting of a handle, a shank, a wheel member, and means for mounting said wheel member on said shank for free rotation in either direction, said wheel member having hollowed opposite faces and a relatively thick periphery with the edge of the opposite faces of same having substantially the same radii from the axis of the wheel and being sharpened, whereby same may be used for deburring by rotating the assembly in either direction about the axis of the handle.

JOHN P. MICHELA.

REFERENCES CITED

The following references are of record in the file of this patent:

UNITED STATES PATENTS

| Number | Name | Date |
| --- | --- | --- |
| 93,119 | Prescott | July 27, 1869 |
| 318,994 | Lake | June 2, 1885 |
| 644,595 | Grabler | Mar. 6, 1900 |
| 761,055 | Angell | May 31, 1904 |
| 841,332 | Lehnert | Jan. 15, 1907 |